US010637052B2

(12) United States Patent
Put et al.

(10) Patent No.: US 10,637,052 B2
(45) Date of Patent: Apr. 28, 2020

(54) COMPOSITE POWDER FOR USE IN AN ANODE OF A LITHIUM ION BATTERY, METHOD FOR MANUFACTURING A COMPOSITE POWDER AND LITHIUM ION BATTERY

(71) Applicant: Umicore, Brussels (BE)

(72) Inventors: Stijn Put, Olmen (BE); Dirk Van Genechten, Koersel (BE); Nicolas Marx, Geel (BE)

(73) Assignee: Umicore, Brussels (BE)

( * ) Notice: Subject to any disclaimer, the term of this patent is extended or adjusted under 35 U.S.C. 154(b) by 169 days.

(21) Appl. No.: 15/569,402

(22) PCT Filed: Apr. 26, 2016

(86) PCT No.: PCT/EP2016/059269
§ 371 (c)(1),
(2) Date: Oct. 26, 2017

(87) PCT Pub. No.: WO2016/174022
PCT Pub. Date: Nov. 3, 2016

(65) Prior Publication Data
US 2018/0083275 A1 Mar. 22, 2018

(30) Foreign Application Priority Data

Apr. 28, 2015 (EP) .................................. 15165429

(51) Int. Cl.
H01M 4/38 (2006.01)
H01M 4/36 (2006.01)
(Continued)

(52) U.S. Cl.
CPC ......... H01M 4/386 (2013.01); H01M 4/0471 (2013.01); H01M 4/364 (2013.01);
(Continued)

(58) Field of Classification Search
CPC ...... H01M 4/364; H01M 4/386; H01M 4/583; H01M 2004/027; H01M 10/052; H01M 10/0525; H01M 4/0471; H01M 4/587
(Continued)

(56) References Cited

U.S. PATENT DOCUMENTS

2012/0321959 A1* 12/2012 Yushin ................... H01M 4/587
429/225
2013/0234074 A1* 9/2013 Gilles ................... B22F 1/0011
252/504

FOREIGN PATENT DOCUMENTS

CN 101632187 A 1/2010
JP 2008235247 A 10/2008
JP 5348878 B2 11/2013

OTHER PUBLICATIONS

English Machine Translation of "Negative electrode material for lithium ion secondary battery and its manufacturing method, negative electrode for lithium ion ion battery, and lithium-ion secondary battery" by Madokoro Yasushi et al. in JP2008235247 (A)—Oct. 2, 2008 (Year: 2008).*

(Continued)

Primary Examiner — Jonathan G Jelsma
Assistant Examiner — Omar M Kekia
(74) Attorney, Agent, or Firm — NK Patent Law

(57) ABSTRACT

Composite powder for use in an anode of a lithium ion battery, whereby the particles of the composite powder comprise a carbon matrix material and silicon particles embedded in this matrix material, characterized in that the composite powder further comprises silicon carbide.

14 Claims, 2 Drawing Sheets

Figure 1:
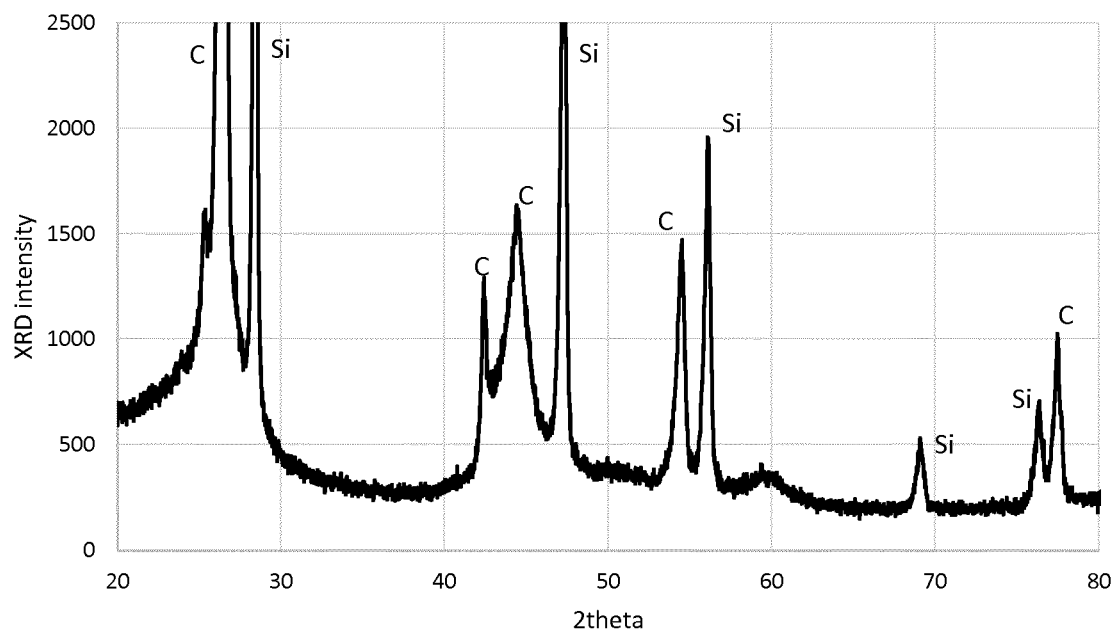

(51) Int. Cl.
   *H01M 4/583*     (2010.01)
   *H01M 4/587*     (2010.01)
   *H01M 10/052*    (2010.01)
   *H01M 4/04*      (2006.01)
   *H01M 10/0525*   (2010.01)
   *H01M 4/02*      (2006.01)

(52) U.S. Cl.
   CPC ........... *H01M 4/583* (2013.01); *H01M 4/587* (2013.01); *H01M 10/052* (2013.01); *H01M 10/0525* (2013.01); *H01M 2004/027* (2013.01)

(58) Field of Classification Search
   USPC ..................................................... 429/231.8
   See application file for complete search history.

(56) References Cited

OTHER PUBLICATIONS

International Search Report for PCT/EP2016/059269, dated May 30, 2016.
Wen, Zhenhai, et al., "Rational design of carbon network cross-linked Si—SiC hollow nanosphere as anode of lithium-on batteries" Royal Society of Chemistry, Nanoscale, Nov. 7, 2013, vol. 6; pp. 342-351.

* cited by examiner

US 10,637,052 B2

COMPOSITE POWDER FOR USE IN AN ANODE OF A LITHIUM ION BATTERY, METHOD FOR MANUFACTURING A COMPOSITE POWDER AND LITHIUM ION BATTERY

This application is a National Stage application of International Application No. PCT/EP2016/059269, filed Apr. 26, 2016. This application also claims priority to European Application No. EP15165429.0, filed Apr. 28, 2015.

The present invention relates to a composite powder for use in an anode of a lithium ion battery, to a method for manufacturing such a composite powder and to a lithium ion battery comprising such a composite powder.

BACKGROUND

Lithium ion (Li-ion) batteries are currently the best performing batteries and already became the standard for portable electronic devices. In addition, these batteries already penetrated and rapidly gain ground in other industries such as automotive and electrical storage. Enabling advantages of such batteries are a high energy density combined with a good power performance.

A Li-ion battery typically contains a number of so-called Li-ion cells, which in turn contain a positive (cathode) electrode, a negative (anode) electrode and a separator which are immersed in an electrolyte. The most frequently used Li-ion cells for portable applications are developed using electrochemically active materials such as lithium cobalt oxide or lithium nickel manganese cobalt oxide for the cathode and a natural or artificial graphite for the anode.

It is known that one of the important limitative factors influencing a battery's performance and in particular battery's energy density is the active material in the anode. Therefore, to improve the energy density, newer electrochemically active materials based on e.g. tin, aluminium and silicon were investigated and developed during the last decades, such developments being mostly based on the principle of alloying said active material with Li during Li incorporation therein during use.

The best candidate seems to be silicon as theoretical capacities of 3579 mAh/g or 2200 mAh/cm$^3$ can be obtained and these capacities are far larger than that of graphite (372 mAh/g) but also those of other candidates.

Note that throughout this document silicon is intended to mean the element Si in its zerovalent state. The term Si will be used to indicate the element Si regardless of its oxidation state, zerovalent or oxidised.

However, one drawback of using a silicon based electrochemically active material in an anode is its large volume expansion during charging, which is as high as 300% when the lithium ions are fully incorporated, e.g. by alloying or insertion, in the anode's active material—a process often called lithiation. The large volume expansion of the silicon based materials during Li incorporation may induce stresses in the silicon, which in turn could lead to a mechanical degradation of the silicon material.

Repeated periodically during charging and discharging of the Li-ion battery, the repetitive mechanical degradation of the silicon electrochemically active material may reduce the life of a battery to an unacceptable level.

In an attempt to alleviate the deleterious effects of the volume change of the silicon, many research studies showed that by reducing the size of the silicon material into submicron or nanosized silicon particles, typically with an average size smaller than 500 nm and preferably smaller than 150 nm, and using these as the electrochemically active material may prove a viable solution.

In order to accommodate the volume change, composite particles are usually used in which the silicon particles are mixed with a matrix material, usually a carbon based material, but possibly also a silicon based alloy or $SiO_2$. In the present invention, only composites having carbon as matrix material are considered.

Further, a negative effect of silicon is that a thick SEI, a Solid-Electrolyte Interface, may be formed on the anode. An SEI is a complex reaction product of the electrolyte and lithium, and therefore leads to a loss of lithium availability for electrochemical reactions and therefore to a poor cycle performance, which is the capacity loss per charging-discharging cycle. A thick SEI may further increase the electrical resistance of a battery and thereby limit the achievable charging and discharging rates.

In principle the SEI formation is a self-terminating process that stops as soon as a 'passivation layer' has formed on the silicon surface. However, because of the volume expansion of silicon, both silicon and the SEI may be damaged during discharging (lithiation) and recharging (de-lithiation), thereby freeing new silicon surface and leading to a new onset of SEI formation.

In the art, the above lithiation/de-lithiation mechanism is generally quantified by a so-called coulombic efficiency, which is defined as a ratio (in % for a charge-discharge cycle) between the energy removed from a battery during discharge compared with the energy used during charging. Most work on silicon-based anode materials is therefore focused on improving said coulombic efficiency.

Current methods to make such silicon based composites are based on mixing the individual ingredients (e.g. silicon and carbon or a precursor for the intended matrix material) during preparation of the electrode paste formulation, or by a separate composite manufacturing step that is then carried out via dry milling/mixing of silicon and host material (possible followed by a firing step), or via wet milling/mixing of silicon and host material (followed by removal of the liquid medium and a possible firing step).

Despite the advances in the art of negative electrodes and electrochemically active materials contained therein, there is still a need for yet better electrodes that have the ability to further optimize the performance of Li-ion batteries. In particular, for most applications, negative electrodes having improved capacities and coulombic efficiencies are desirable.

Therefore, the invention concerns a composite powder for use in an anode of a lithium ion battery, whereby the particles of the composite powder comprise a carbon matrix material and silicon particles dispersed in this matrix material, whereby the composite powder further comprises silicon carbide whereby the ordered domain size of the silicon carbide, as determined by the Scherrer equation applied to the X-ray diffraction SiC peak having a maximum at 2θ between 35.4° and 35.8°, when measured with a copper anticathode producing Kα1 and Kα2 X-rays with a wavelength equal to 0.15418 nm, is at most 15 nm and preferably at most 9 nm and more preferably at most 7 nm.

The Scherrer equation (P. Scherrer; Göttinger Nachrichten 2, 98 (1918)) is a well known equation for calculating the size of ordered domains from X-Ray diffraction data. In order to avoid machine to machine variations, standardized samples can be used for calibration.

The composite powder according to the invention has a better cycle performance than traditional powders. Without being bound by theory, the inventors believe that the silicon carbide improves the mechanical bond between the silicon particles and the carbon matrix material, so that stresses on the interface between the silicon particles and the matrix material, e.g. those associated with expansion and contraction of the silicon during use of the battery, are less likely to lead to a disconnection of the silicon particles from the matrix material. This, in turn, allows for a better transfer of lithium ions from the matrix to the silicon and vice versa. Additionally, less silicon surface is then available for the formation of a SEI.

Preferably said silicon carbide is present on the surface of said silicon particles, so that said silicon carbide forms a partial or complete coating of said silicon particles and so that the interface between said silicon particles and said carbon is at least partly formed by the said silicon carbide.

It is noted that silicon carbide formation may also occur with the traditional materials, if silicon embedded in carbon or a carbon precursor is overheated, typically to well over 1000 degrees. However, this will in practice not lead to a limited, superficial formation of chemical Si—C bonds, as is shown to be beneficial in the present invention, but to a complete conversion of silicon to silicon carbide, leaving no silicon to act as anode active material. Also, in such circumstances a highly crystalline silicon carbide is formed.

The silicon carbide in a powder according to the present invention is present as a thin layer of very small silicon carbide crystals or poorly crystalline silicon carbide, which shows itself as having, on an X-Ray diffractogram of the composite powder, a peak having a maximum at 2θ between 35.4° and 35.8°, having a width at half the maximum height of more than 1.0°, which is equivalent to an ordered domain size of 9 nm as determined by the Scherrer equation applied to the SiC peak on the X-Ray diffractogram at 2θ=35.6°, when measured with a copper anticathode producing Kα1 and Kα2 X-rays with a wavelength equal to 0.15418 nm. Preferably, the composite powder has an oxygen content which is 3 wt % or less, and preferably 2 wt % or less. A low oxygen content is important to avoid too much lithium consumption during the first battery cycles.

Preferably the composite powder has a particle size distribution with $d_{10}$, $d_{50}$ and $d_{90}$ values, whereby $(d_{90}-d_{10})/d_{50}$ is 3 or lower.

The $d_{50}$ value is defined as diameter of a particle of the composite powder corresponding to 50 weight % cumulative undersize particle size distribution. In other words, if for example $d_{50}$ is 12 µm, 50% of the total weight of particles in the tested sample are smaller than 12 µm. Analogously $d_{10}$ and $d_{90}$ are the particle sizes compared to which 10% respectively 90% of the total weight of particles is smaller.

A narrow PSD is of crucial importance since small particles, typically below 1 µm, result in a higher lithium consumption caused by electrolyte reactions. Excessively large particles on the other hand are detrimental for the final electrode swelling.

Preferably less than 25% by weight, and more preferably less than 20% by weight of all Si present in the composite powder is present in the form of silicon carbide, as Si present in the form of silicon carbide is not available as anode active material capable of being lithiated and delithiated.

In order to have an appreciable effect more than 0.5% by weight of all Si present in the composite powder should be present in the form of silicon carbide.

The invention further concerns a method of manufacturing a composite powder, preferably a composite powder as described above according the invention, comprising the following steps:

A: Providing a first product comprising one or more of products I, II and III
B: Providing a second product being carbon or being a precursor for carbon, and preferably being pitch, whereby said precursor can be thermally decomposed to carbon at a temperature less than a first temperature;
C: Mixing said first and second products to obtain a mixture;
D: Thermally treating said mixture at a temperature less than said first temperature;
whereby product I is: silicon particles having on at least part of their surface silicon carbide;
whereby product II is: silicon particles that can be provided on at least part of their surface with silicon carbide by being exposed to a temperature less than said first temperature and by being provided on their surface with a compound containing C atoms and capable of reacting with silicon at a temperature less than said first temperature to form silicon carbide; and
whereby product III is: silicon particles that can be provided on at least part of their surface with silicon carbide by being exposed to a temperature less than said first temperature and by being provided on their surface with a precursor compound for silicon carbide, said precursor compound comprising Si atoms and C atoms and being capable of being transformed into silicon carbide a temperature less than said first temperature;
whereby said first temperature is 1075° C. and preferably 1020°.

Figure 2:
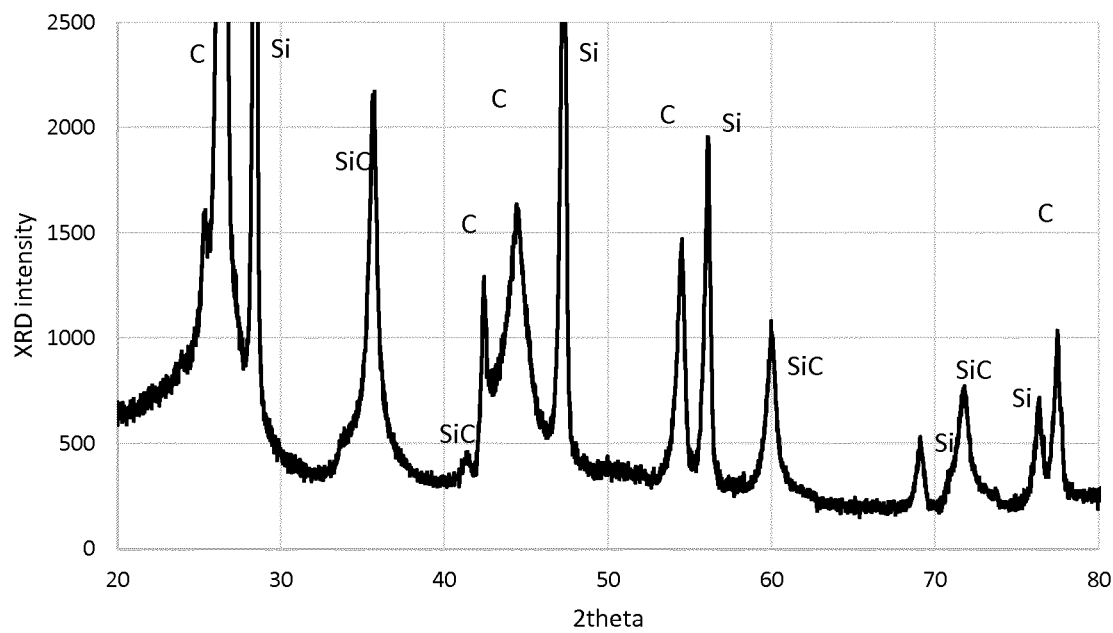
Figure 3:
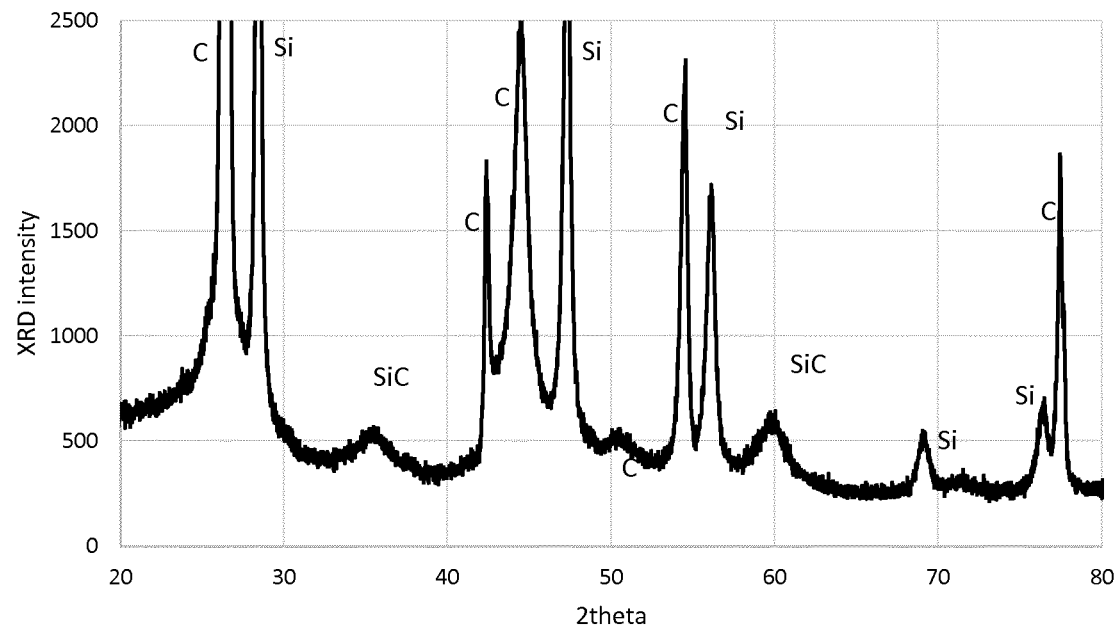
Figure 4:
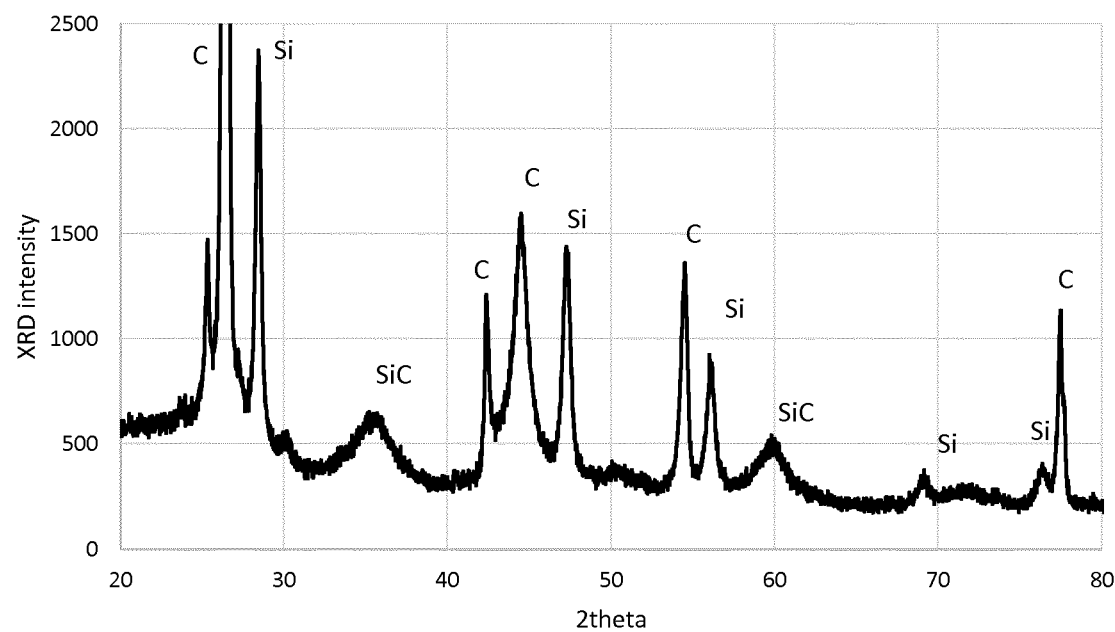

The invention will be further explained by the following examples and counterexample and the following figures, in which FIGS. 1 and 2 show an X-Ray diffractogram of a composite powder not according to the invention; and FIGS. 3 and 4 shows X-Ray diffractograms of composite powders according to the invention.

ANALYTICAL METHODS USED

Determination of Oxygen Content

The oxygen contents of the powders in the examples and the counterexamples were determined by the following method, using a Leco TC600 oxygen-nitrogen analyzer.

A sample of the powder was put in a closed tin capsule that was put itself in a nickel basket. The basket was put in a graphite crucible and heated under helium as carrier gas to above 2000° C.

The sample thereby melts and oxygen reacts with the graphite from the crucible to CO or $CO_2$ gas. These gases are guided into an infrared measuring cell. The observed signal is recalculated to an oxygen content.

Determination of Particle Size Distribution

Particle size distributions (PSD) were determined on suspensions of powders by light-scattering method using commercially available equipment. A Malvern 2000 equipment from Malvern Instruments GmbH, Herrenberg, Del., was used. The following measurement conditions were selected: compressed range; active beam length 2.4 mm; measurement range: 300 RF; 0.01 to 900 µm. The specimen preparation and measurement were carried out in accordance with the manufacturer's instructions.

Determination of the Presence and Ordered Domain Size of Silicon Carbide

XRD measurements are performed on a Panalytical 'X Pert Pro system with CuKα1 and CuKα2 radiation, λ=0.15418 nm, with a step size of 0.017° 2θ, scan rate of 34 minutes (2064 seconds) and measuring from 5° to 90° 2θ on a flattened surface of about 2 cc powder material at least, using the ICDD database, PDF-4+, for the identification of present compounds.

The mean size of ordered SiC domains was determined by the Scherrer equation applied to the SiC peak having a maximum on the X-Ray diffractogram at 2θ between 35.4° and 35.8°.

Determination of Electrochemical Performance

All composite powders to be tested were sieved using a 45 μm sieve and mixed with carbon black, carbon fibres and sodium carboxymethyl cellulose binder in water (2.5 wt %). The ratio used was 90 weight parts composite powder/3 weight parts carbon black/2 weight parts carbon fibres and 5 weight parts carboxymethyl cellulose (CMC).

These components were mixed in a Pulverisette 7 planetary ball mill for 30 minutes at 250 rpm. A copper foil cleaned with ethanol was used as current collector. A 150 μm thick layer of the mixed components was coated on the copper foil. The coating was dried for 45 minutes in vacuum at 50° C. A 1.27 cm$^2$ circle was punched from the dried coated copper foil and used as an electrode in a coin cell using lithium metal as counter electrode. The electrolyte was 1M LiPF$_6$ dissolved in EC/DEC 1/1+2% VC+10% FEC solvents. All samples were tested in a coin-cell tester with high precision (Maccor 4000 series).

The applied cycling schedule was lithiation until 10 mV at C/2 (C/10 for 1$^{st}$ cycle), followed by a constant voltage (CV) step with cut-off current at C/50 (C/200 for 1$^{st}$ cycle) and delithiation until 1.2V (1.5V for 1$^{st}$ cycle) at C/2 (C/10 for 1$^{st}$ cycle). The first delithiation capacity and the coulombic efficiency of repeated charging and discharging cycles was determined. The average coulombic efficiency of the 5$^{th}$ to 50$^{th}$ cycle is reported.

The skilled person will be aware that a small difference in coulombic efficiency per cycle, will have, over the hundreds or thousands of charging-discharging cycles a battery is expected last, a significant cumulative effect.

Counterexample 1

In a first step a nano silicon powder was obtained by applying a 60 kW radio frequency (RF) inductively coupled plasma (ICP), using an argon-hydrogen mixture as plasma gas, to which a micron-sized silicon powder precursor was injected at a rate of 220 g/h, resulting in a prevalent (i.e. in the reaction zone) temperature above 2000 K. In this first process step the precursor became totally vaporized followed. In a second process step an argon flow was used as quench gas immediately downstream of the reaction zone in order to lower the temperature of the gas below 1600 K, causing a nucleation into metallic submicron silicon powder.

In a second step a passivation was performed at a temperature of 100° C. during 5 minutes by adding 100 l/h of a N$_2$/O$_2$ mixture containing 0.15 mole % oxygen.

The gas flow rate for both the plasma and quench gas in the first and second steps was adjusted to obtain nano silicon powder with a BET of 40 m$^2$/g and an oxygen content of 4.0 wt % after the second step. In the present case 2.5 Nm$^3$/h Ar/H$_2$ with 4 vol % H$_2$ was used for the plasma and 10 Nm$^3$/h Ar was used as quench gas.

A blend was made of 8 g of the obtained nano silicon powder and 27 g petroleum based pitch powder. This was heated to 450° C. under N$_2$, so that the pitch melted, and, after a waiting period of 60 minutes, mixed for 30 minutes by means of a dispersion disk. The suspension of nano silicon in pitch thus obtained was cooled under N$_2$ to room temperature and grinded.

A quantity of 4.4 g of the ground mixture was mixed with 7 g graphite for 3 hrs on a roller bench, after which the obtained mixture was passed through a mill to de-agglomerate it. A thermal after treatment was given to the mixture as follows: The powder was put in a quartz crucible in a tube furnace, heated up at a heating rate of 3° C./min to 1000° C. and kept at such temperature for two hours and then cooled. All this was performed under argon atmosphere. The fired product was pulverized to form a composite powder and sieved on a 400 mesh sieve.

Counter Example 2

The method as described in Counter example 1 was mainly followed with one exception as explained below.

The first step to synthesize the silicon powder; the second step, i.e. the passivation treatment; and the procedure to create a suspension of nano silicon in pitch, were kept identical to Counter example 1.

A quantity of 4.4 g of the ground mixture was then mixed with 7 g graphite for 3 hrs on a roller bench, after which the obtained mixture was passed through a mill to de-agglomerate it. Then, the thermal after treatment given to the mixture differs from Counter Example 1 in that the powder was put in a quartz crucible in a tube furnace, and was subsequently heated up to 1100° C. at a heating rate of 3° C./min and kept at such temperature for two hours and then cooled. All this was performed under argon atmosphere. The fired product was pulverized to form a composite powder and sieved on a 400 mesh sieve.

Example 1

The method as described in counterexample 1 was mainly followed with one exception as explained below.

A first step was performed as in counterexample 1.

In the second step the passivation conditions were changed by changing the passivation gas to 100 L/h of an argon/acetylene mixture with 10 vol % acetylene to form a nano silicon powder, also having a specific surface area of 40 m$^2$/g, with SiC phases at the surface. Carbon analysis indicated the presence of 2.8 wt % of carbon, indicating that approx. 8.5 wt % of the powder consisted of SiC.

The obtained nano silicon powder was further processed identically to the nano silicon powder of counterexample 1.

Example 2

The method as described in example 1 was mainly followed with the following changes, all in the first step:
 a 70 kW plasma, instead of 60 kW plasma was used
 the precursor feed rate was 80 g/hr instead of 220 g/hr
 the quench gas flowrate was 20 Nm$^3$/h instead of 10 Nm$^3$/h This led to a nano silicon powder, having a specific surface area of 67 m$^2$/g after the second step, with SiC phases at the surface. Carbon analysis indicated the presence of 5.4 wt % of carbon, indicating that approx. 15 wt % of the powder consisted of SiC.

The fact that the carbon content increases nearly proportionally with the surface area of the silicon powder leads to the conclusion that the SiC formation reaction is a surface reaction leading to SiC which is mainly present at the surface of the silicon particles.

The obtained nano silicon powder was further processed identically to the silicon powder of counterexample 1 and example 1.

Analysis of the Products of the Examples and Counterexample

The composite powders produced in examples 1 and 2 and the counterexamples were analyzed by XRD and subjected to electrochemical testing as described above. The results obtained are reported in the following table and in FIGS. 1 and 2 for counterexamples 1 and 2 and in FIGS. 3 and 4 for examples 1 and 2. A significant improvement of the electrochemical performance, contributable to the presence of SiC on the surface of the nano silicon powder, in particular poorly crystalline SiC, is observed.

| Product | Mean size of ordered SiC domains (nm) | 1st delithiation capacity (mAh/g) | Coulombic efficiency, average of cycle 5-50 (%) |
|---|---|---|---|
| Counterexample 1 | No SiC | 630 | 99.46 |
| Counterexample 2 | 17.9 | 430 | 99.52 |
| Example 1 | 5.7 | 670 | 99.65 |
| Example 2 | 5.8 | 655 | 99.78 |

The final composite powders of example 1 and example 2 had an oxygen content of 1.2, respectively 1.6 weight %.

Furthermore, both composite powders have a $d_{50}$ particles size of 15.7 and 11.2 μm, and a narrow PSD expressed by the $(d_{90}-d_{10})/d_{50}$ values of respectively 2.7 and 2.8, as can be seen from the results shown in the table below.

| Composite powder | $d_{10}$ (μm) | $d_{50}$ (μm) | $d_{90}$ (μm) |
|---|---|---|---|
| Example 1 | 4.0 | 15.7 | 47 |
| Example 2 | 3.1 | 11.2 | 35 |

The invention claimed is:

1. A composite powder for use in an anode of a lithium ion battery, the composite powder comprising a carbon matrix material, silicon particles embedded in the matrix material, and silicon carbide, wherein the composite powder has a particle size distribution with a $d_{10}$, $d_{50}$ and $d_{90}$ value, wherein $(d_{90}-d_{10})/d_{50}$ is 3 or lower and wherein an ordered domain size of the silicon carbide, as determined by the Scherrer equation applied to the X-ray diffraction SiC peak having a maximum at 2θ between 35.4° and 35.8°, when measured with a copper anticathode producing Kα1 and Kα2 X-rays with a wavelength equal to 0.15418 nm, is at most 15 nm.

2. The composite powder according to claim 1, wherein the ordered domain size of the silicon carbide is at most 9 nm.

3. The composite powder according to claim 1, wherein said silicon carbide is present on surfaces of said silicon particles.

4. The composite powder according to claim 1, wherein said silicon particles have an average particle size of 500 nm or less.

5. The composite powder according to claim 1, wherein the composite powder has an oxygen content that is 3 wt % or less.

6. The composite powder according to claim 1, wherein less than 25% by weight of all silicon present in the composite powder is present in the form of silicon carbide.

7. The composite powder according to claim 1, wherein the powder has a particle size distribution with a $d_{50}$ value between 10 μm and 20 μm.

8. A lithium ion battery having an anode comprising the composite powder according to claim 1.

9. A method of manufacturing a composite powder, the method comprising:
   A: providing a first product comprising one or more of products I, II and III;
   B: providing a second product comprising carbon or a precursor for carbon, wherein said precursor can be thermally decomposed to carbon at a temperature less than a first temperature;
   C: mixing said first and second products to obtain a mixture; and
   D: thermally treating said mixture at a temperature less than said first temperature to obtain the composite powder,
   wherein product I comprises silicon particles having on at least part of their surfaces silicon carbide;
   wherein product II comprises silicon particles having on their surfaces a precursor compound for silicon carbide, the precursor comprising C atoms and being capable of reacting with silicon at a temperature less than said first temperature to form silicon carbide; and
   wherein product III comprises silicon particles having on their surfaces a precursor compound for silicon carbide, the precursor comprising Si atoms and C atoms and being capable of being transformed into silicon carbide at a temperature less than said first temperature; and
   wherein said first temperature is 1075° C.

10. The method according to claim 9, wherein said silicon particles have an average particle size of 500 nm or less.

11. The method according to claim 9, wherein said second product is pitch.

12. The method according to claim 9, wherein the composite powder being manufactured is a composite powder for use in an anode of a lithium ion battery, the composite powder comprising a carbon matrix material, silicon particles embedded in the matrix material, and silicon carbide, wherein the composite powder has a particle size distribution with a $d_{10}$, $d_{50}$ and $d_{90}$ value, wherein $(d_{90}-d_{10})/d_{50}$ is 3 or lower and wherein an ordered domain size of the silicon carbide, as determined by the Scherrer equation applied to the X-ray diffraction SiC peak having a maximum at 2θ between 35.4° and 35.8°, when measured with a copper anticathode producing Kα1 and Kα2 X-rays with a wavelength equal to 0.15418 nm, is at most 15 nm.

13. A lithium ion battery having an anode comprising a composite powder formed using the method according to claim 9.

14. The method according to claim 9, wherein said first temperature is 1020° C.

* * * * *